United States Patent Office 3,450,646
Patented June 17, 1969

3,450,646
HETEROCYCLIC POLYMERS
Robert R. Annand, Derek Redmore, and Brian M. Rushton, St. Louis, Mo., assignors to Petrolite Corporation, Wilmington, Del., a corporation of Delaware
No Drawing. Filed Oct. 22, 1965, Ser. No. 502,447
Int. Cl. C08g 33/08
U.S. Cl. 260—2          3 Claims

ABSTRACT OF THE DISCLOSURE

Heterocyclic polymers containing a cyclic amidine group, or a related group, in the main chain of the polymer formed by the intermolecular reaction of a cyanoethylated cyclic amidine-forming polyalkylenepolyamine.

---

This invention relates to heterocyclic polymers, such as polymers containing a heterocyclic group in a unit of the main polymeric chain. More particularly, this invention relates to heterocyclic polymers containing a cyclic amidine group, or a related group, in a unit of the polymeric chain. This invention also relates to the processes by which they are prepared, derivatives thereof, and uses therefore.

One embodiment of this invention relates to cyclic amidine polymers formed by the intermolecular reaction of a cyanoethylated cyclic amidine-forming polyalkylenepolyamine as illustrated by the following equations:

(1)
$NH_2CH_2CH_2NH_2 + CH_2{=}CHCN \longrightarrow$ $NH_2CH_2CH_2\overset{H}{N}{-}CH_2CH_2CN \longrightarrow$

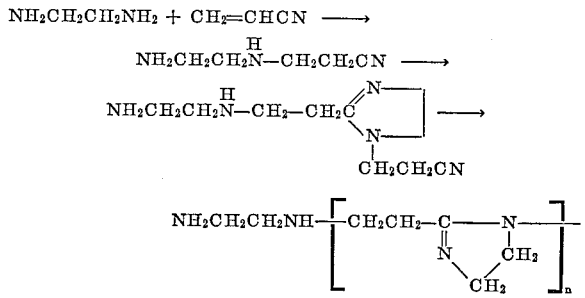

(2)
$NH_2(CH_2)_3NH_2 + CH_2{=}CHCN \longrightarrow$ $NH_2(CH_2)_3\overset{H}{N}{-}CH_2CH_2CN \longrightarrow$

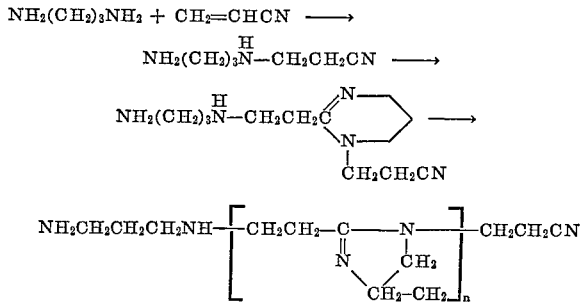

Analogous polymers can also be formed from higher cyclic-amidine-forming polyamines $NH_2CH_2CH_2\overset{H}{N}CH_2CH_2NH_2 + CH_2{=}CHCN \longrightarrow$ $NH_2CH_2CH_2\overset{H}{N}{-}CH_2CH_2\overset{H}{N}{-}CH_2CH_2CN \longrightarrow$

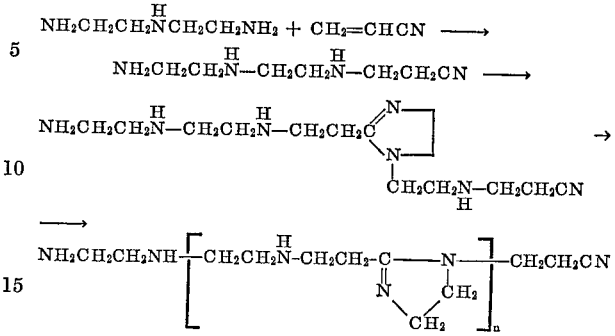

Where higher cyclic amidine-forming polyalkylene amines are employed, analogous polymers will be formed, for example those of the formula

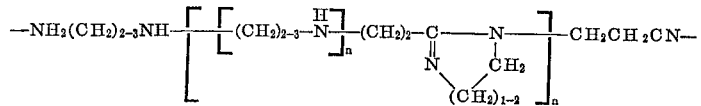

The

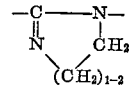

group is an example of a cyclic-amidine group which includes the imidazoline and tetrahydropyrimidine rings. The hydrogens may or may not be substituted with other groups such as alkyl groups, methyl, ethyl, etc.

In another embodiment, this invention relates to the reaction of cyclic amidine-forming polyamines with polynitriles, such as $X(CN)_z$, where z is a number 2, 3, 4, or greater, but preferably dinitriles, for example of the formula NC—X—CN, and X is a radical, for example, a hydrocarbon group such as an alkylene, alkenylene, cycloalkylene, aromatic, etc., and those groups containing other elements besides carbon and hydrogen such as a heterocyclic, amino-containing, etc. groups.

This type of reaction is illustrated by the following reactions:

$NC{-}X{-}CN + NH_2{-}A{-}\overset{H}{N}{-}Z{-}\overset{H}{N}{-}A{-}NH_2 \longrightarrow$ a polymer characterized by the following unit:

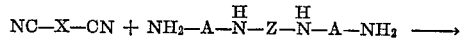

where X is the moiety of the dinitrile, A is moiety when combined with the amino groups is a cyclic-amidine forming group, and Z is a moiety joining two cyclic-amidine forming groups.

These are specifically illustrated by the following:

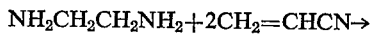

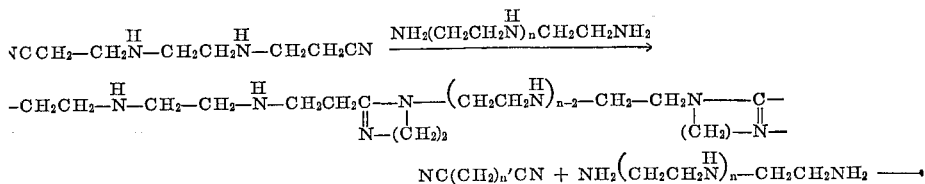

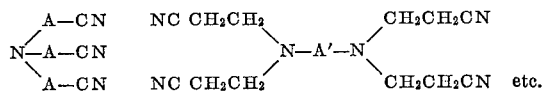

a polymer characterized by the following unit:

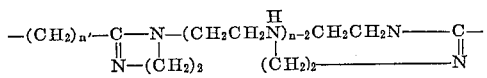

The preferred nitrile employed herein is a vinyl nitrile such as acrylonitrile $CH_2=CHCN$, or a derivative thereof such as

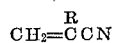

wherein R is a hydrocarbon group, such as alkyl, e.g. methyl, ethyl, etc., for example, methacrylonitrile, ethacrylonitrile, etc.

The amines employed herein are polyalkylenepolyamines, for example, of the formula:

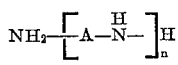

where $n$ is an integer 1, 2, 3, 4, 5, 6, 7, 8, 9, 10, etc., and A is an alkylene group, provided that the polyamine contains an alkylene moiety of a cyclic-amidine forming group, i.e., a group having a

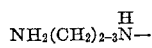

group.

One or more of the hydrogens on the $CH_2$ groups may be substituted for example, by such groups as alkyl groups, for example, methyl, ethyl, etc. Examples of A include

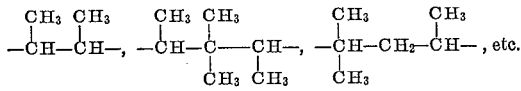

Examples of polyamines include the following ethylene diamine, propylene diamine, diethylene triamine, dipropylene triamine, triethylene tetramine, tripropylene tetramine, tetraethylene pentamine, tetrapropylene pentamine, polyalkyleneimines, i.e. the higher molecular weight amines derived from alkyleneimine such as polyethyleneimines, polypropyleneimines, etc. Mixtures of the above polyamine amines and those polyamines containing both ethylene and propylene groups, for example

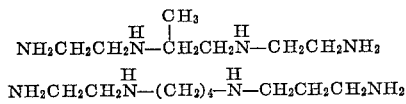

etc., can be employed.

Some of the N-groups may be substituted (provided the polyamine is cyclic-amidine forming), for example, with hydrocarbon groups such as alkyl groups, etc.

Vinyl nitriles can also be reacted with polyamines to form polynitriles, for example, dinitriles which can react with additional polyamines to form the polymers of this invention. In addition, dinitriles or other polynitriles, without a polyamine bridge between the nitrile groups, can also be employed, for example, alkylene dinitriles, nitrilo tripropionitrile, etc., to react with the polyamines. Examples of nitriles include $NC-(CH_2)_{n'}-CN$, such as where $n'$ is for example 2–10 or more, substituted derivatives thereof, etc.

Examples of polynitriles include the following:

where A is for example alkylene, e.g., ethylene, propylene, e.g., ethylene, propylene, etc., and A′ is alkylene, an alkyleneamine group, etc.

The reaction of the polyamine with acrylonitrile is carried out in the conventional manner. In most cases a catalyst is not required, but a catalyst can be employed if desired. Methods of preparing mono- and dicyanoethylated amines are described in the Chemistry of Acrylonitriles, 2nd ed., 1959, published by American Cyanamid Co. The amine can be cyanoethylated so that a residuary cyclic amidine-forming group remains or until a dinitrile is formed. Stoichometric amounts of reactants can be employed. However, in preparing the monocyanoethylated product it is preferred to employ an excess of the polyamine and in the case of the dicyanoethylated product an excess of the nitrile. In general the amine addition is carried out at from about 0 to 50° C. or higher, such as from about 10° to 40° C., for example from about 20° to 30° C., but preferably from about 25° to 28° C. The optimum temperature will of course depend upon the particular amine employed and the particular product desired.

The mono-cyanoethylated cyclic amidine-forming polyamine or the dicyanoethylated polyamine or other polynitrile is then intermolecularly reacted with itself or with a polyamine under cyclic amidine forming conditions to form the polymer of this invention. Although the reaction may proceed without a catalyst it is preferable that a catalyst be employed to speed up the reaction. Among such catalysts are organic and inorganic salts such as sulfonic acids, etc. However, it is preferred to use sulfur compounds such as $H_2S$, thioacids, thioamides, thioketones, thiourea, dithiobiurette, etc., as catalysts.

In general the temperature of polymerization will vary with the particular reactants, catalysts, etc. In general, the reaction is carried out from about 75° to 200° C., such as from about 100° to 175° C., but perferably from about 150° to 170° C. Optimum temperatures will vary with the particular system.

The molecular weight of the polymer can vary widely depending on various factors such as reactants, conditions, ultimate uses, etc. In general, the polymer may contain about 2 to 100 or more units, such as 5–50, for example, 8–40, but we have found that polymers having 4–15 are advantageously employed for the uses disclosed herein.

In addition, to the basic form of these polymers, one can, in certain instances, prepare salts or quaternaries, either with organic or inorganic acids or quaternizing agents such as benzyl halides, alkyl halides, etc., dihalides such as alkylene dihalide, xylylene dihalides, alkylene ether dihalides such as $(XCH_2CH_2)_2O$, etc. Being basic the cyclic amidine unit readily forms salts, including di- and polysalts.

Examples of acids which can be employed to form salts include HCl, $H_2SO_4$, $H_3PO_4$, hydrocarbon sulfonic acids, acetic acid, oxalic acid, maleic acid, oleic acid, abietic acid, naphthenic acid, rosin, benzoic acid, phthalic acid, diglycollic acid, etc.

The following examples are presented for purposes of illustration and not of limitation.

EXAMPLE 1

Ethylene diamine (480.8 g., 8 mole) was placed in a 2 liter four-necked round-bottom flask and acrylonitrile (106.1 g., 2 mole) added over a 15 min. period maintaining the reaction temperature between 25–30° C. The excess ethylene diamine (E.D.) was removed under reduced pressure (4–10 mm.).

The residual compound, namely N-cyanoethyl-1,2-diaminoethane, was now heated at 130–155° C. in the presence of 2 g. thiourea and condensation polymerization took place accompanied by ammonia evolution. After 10 hrs. reaction, a further 2 g. of thiourea was added and the reaction was continued until a total of 20 hours reaction time had elapsed. At this time, the reaction was deemed complete and ammonia estimation indicated at 96% conversion.

Purification was achieved by taking the polymer up in chloroform (100 ml.), precipitating with ether (300 ml.) and repeating the operation three times. The polymer was then found to have a molecular weight of between 800–900 as determined by osmometry. The polymer had repetitive

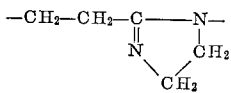

units.

EXAMPLE 2

Example 1 was repeated except that thioacetamide was employed as a catalyst. A similar polymer was prepared as in Example 1.

EXAMPLE 3

Example 1 was repeated except that N-cyanoethyl-1,2-diaminoethane was neutralized with one-equivalent (2 mole) of para-toluenesulfonic acid before polymerizing. The polymerization was carried out by heating for 8 hours at 150–180° with vigorous stirring until the evolution of ammonia ceased. The product, the para-toluenesulfonate salt of the polyimidazoline, which can be used in this form, was dissolved in water, made slightly alkaline with sodium hydroxide and quickly extracted with chloroform. The polyimidazoline was then obtained by evaporation of the washed and Na$_2$SO$_4$ dried extract. A polymer similar to Example 1 was prepared.

EXAMPLE 4

Methacrylonitrile (67.0 g., 1.0 mole) was added in a dropwise fashion to ethylene diamine (240.4 g., 4 mole) over a 2 hr. period with vigorous stirring. The mixture was then heated at reflux temperature (122°) for 1 hr. At this time, the excess ethylene diamine was removed by distillation under reduced pressure (10 mm.) to give a quantitative yield of N-(2′-cyano-2′-methylethyl)-1,2-diaminoethane.

The above prepared monomer was then heated at 170° C. in the presence of thiourea (1 g.) for 8 hours. Further 1 g. quantities of thiourea were twice added and the polymerization was complete after an additional 17 hours, at the latter temperature. The ammonia evolved was measured and the conversion of monomer to polymer was calculated to be 84%. Infrared analysis showed the presence of the imidazoline ring by virtue of an adsorption band at 6.18 mu. The resulting polymer was one having the following repetitive unit

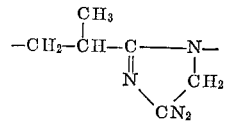

EXAMPLE 5

Ethylene diamine (60.1 g., 1 mole) was added dropwise over 1.5 hours to acrylonitrile (106.2 g., 2 mole) and the temperature was maintained between 25–30° C. with ice water cooling. The reaction mixture was stirred at room temperature for 2 hrs. N,N′-dicyanoethyl-1,2-diaminoethane was then isolated by distillation at reduced pressure (B.P. 160°/2 mm.), $N_D^{25}$ 1.4753, in 53% yield.

Dicyanoethyl-1,2-diaminoethane (41.5 g., 0.25 mole) and triethylene tetramine (36.5 g., 0.25 mole) were copolymerized by heating at 160–170° in the presence of thiourea (0.25 g.) for 5 hrs. The polymerization was completed by heating for a further 9 hrs. with the addition of another portion of thiourea (0.25 g.). The total ammonia evolved corresponded to a 74% conversion of monomer to polymer. The polymer was purified by precipitating it three times from chloroform with ether and the molecular weight was found by osmometry to be 1030. A polymer having the following repetitive units was prepared:

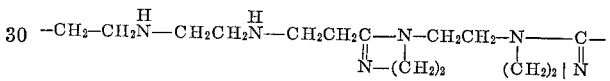

To avoid unnecessary repetition, further non-limiting examples listed in the following table are polymerized by the general procedures outlined above.

The abbreviations in this table have the following meanings:

E.D.—Ethylene diamine
A.N.—Acrylonitrile
P.D.—Propylene diamine
M.A.N.—Methacrylonitrile
T.E.T.—Triethylene tetramine
D.E.T.—Diethylene triamine
T.E.P.—Tetraethylene pentamine
Amine #1—A mixture of T.E.T., D.E.T., and T.E.P., etc.

The moles specified in Table I are actual stoichiometric amounts reacted to form the mono- or the di-cyanoethylated polyamines and polymers. Thus, in Example 6 the monocyanoethylated amine is formed by reacting one mole of the first amine with one mole of the nitrile which is then polymerized. In Example 8, the dicyanoethylated amine is formed by reacting one mole of the first amine with 2 moles of the nitrile and then further polymerized by reaction with the second amine.

TABLE I

| Example: | 1st Amine | Nitrile | 2nd Amine | Cat. | Polymerization Time |
|---|---|---|---|---|---|
| 6 | 1 mole P.D. | 1 mole A.N. | | Thiourea | 20 hrs. |
| 7 | do | 1 mole M.A.N. | | Thioacetamide | 20 hrs. |
| 8 | do | 2 mole M.A.N. | 1 mole T.E.T. | Thiourea | 20 hrs. |
| 9 | do | do | 1 mole T.E.P. | Thioacetamide | 18 hrs. |
| 10 | do | do | 1 mole T.E.T. | Thiourea | 20 hrs. |
| 11 | do | 2 mole A.N. | 1 mole T.E.P. | do | 20 hrs. |
| 12 | 1 mole E.D. | do | do | do | 20 hrs. |
| 13 | 1 mole E.T. | 1 mole A.N. | | Thioacetamide | 18 hrs. |
| 14 | 1 mole D.E.T. | 2 mole A.N. | 1 mole T.E.T. | Thiourea | 20 hrs. |
| 15 | do | 1 mole M.A.N. | | do | 20 hrs. |
| 16 | do | 2 mole M.A.N. | 1 mole T.E.P. | do | 20 hrs. |
| 17 | 1 mole T.E.P. | 1 mole A.N. | | Thioacetamide | 16 hrs. |
| 18 | do | 2 mole A.N. | 1 mole T.E.T. | Thiourea | 20 hrs. |
| 19 | do | do | 1 mole T.E.P. | do | 20 hrs. |
| 20 | do | 1 mole M.A.N. | | Thioacetamide | 16 hrs. |
| 21 | do | 2 mole M.A.N. | 1 mole T.E.T. | Thiourea | 15 hrs. |
| 22 | do | do | 1 mole T.E.P. | do | 15 hrs. |
| 23 | 1 mole D.E.T. | 2 mole A.N. | do | do | 15 hrs. |
| 24 | 1 mole Amine #1 | 1 mole A.N. | | do | 20 hrs. |
| 25 | do | 2 mole A.N. | 1 mole Amine #1 | do | 20 hrs. |
| 26 | do | 1 mole M.A.N. | | do | 20 hrs. |
| 27 | do | 2 mole M.A.N. | 1 mole Amine #1 | do | 20 hrs. |

In summary, the present invention relates to polymers having a cyclic amidine group in a unit of the main polymeric chain. Stated another way, the polymer is characterized by having a cyclic amidine group in the main chain of the polymer as contrasted to a cyclic amidine pendant group.

For example, it is formed by reacting:
(1) a compound containing both the cyclic-amidine forming group and a nitrile group in the same molecule, or
(2) a polynitrile and a cyclic-amidine forming polyamine. In general, where a dinitrile is employed one obtains primarily a linear polymer. Where a tri- or higher nitrile is employed, either alone or in conjunction with a dinitrile, one may obtan a cross-linked polymer. Any nitrile capable of reacting with a cyclic-amidine forming polyamine to form a cyclic amidine polymer can be employed.

Use as corrosion inhibitors

This phase of this invention relates to the use of these polymers in inhibiting the corrosion of metals, most particularly iron, steel and ferrous alloys. These polymers can be used in a wide variety of applications and systems where iron, steel and ferrous alloys are affected by corrosion. They may be employed for inhibiting corrosion in processes which require this protective or passivating coating as by dissolution in the medium which comes in contact with the metal. They can be used in preventing atmospheric corrosion, underwater corrosion, corrosion in steam and hot water systems, corrosion in chemical industries, underground corrosion, etc.

The corrosion inhibitors contemplated herein find special utility in the prevention of corrosion of pipe or equipment which is in contact with a corrosive oil-containing medium, as, for example, in oil wells producing corrosive oil or oil-brine mixtures, in refineries, and the like. These inhibitors may, however, be used in other systems or applications. They appear to possess properties which impart to metals resistance to attack by a variety of corrosive agents, such as brines, weak inorganic acids, organic acids, $CO_2$, $H_2S$, etc.

The method of carrying out this process is relatively simple in principle. The corrosion preventive reagent is dissolved in the liquid corrosive medium in small amounts and is thus kept in contact with the metal surface to be protected. Alternatively, the corrosion inhibitor may be applied first to the metal surface, either as is, or as a solution in some carrier liquid or paste. Continuous application, as in the corrosive solution, is the preferred method, however.

The present process finds particular utility in the protection of metal equipment of oil and gas wells, especially those containing or producing an acidic constituent such as $H_2S$, $CO_2$, organic acids and the like. For the protection of such wells, the reagent, either undiluted or dissolved in a suitable solvent, is fed down the annulus of the well between the casing and producing tubing where it becomes commingled with the fluid in the well and is pumped or flowed from the well with these fluids, thus contacting the inner wall of the casing, the outer and inner wall of tubing, and the inner surface of all wellhead fittings, connections and flow lines handling the corrosive fluid.

Where the inhibitor composition is a liquid, it is conventionally fed into the well annulus by means of a motor driven chemical injector pump, or it may be dumped periodically (e.g., once every day or two) into the annulus by means of a so-called "boll weevil" device or similar arrangement. Where the inhibitor is a solid, it may be dropped into the well as a solid lump or stick, it may be blown in as a powder with gas, or it may be washed in with a small stream of the well fluids or other liquid. Where there is gas pressure on the casing, it is necessary, of course, to employ any of these treating methods through a pressure equalizing chamber equipped to allow introduction of reagent into the chamber, equalization of pressure between chamber and casing, and travel of reagent from chamber to well casing.

Occasionally, oil and gas wells are completed in such a manner that there is no opening between the annulus and the bottom of the tubing or pump. This results, for example, when the tubing is surrounded at some point by a packing held by the casing or earth formation below the casing. In such wells the reagent may be introduced into the tubing through a pressure equalizing vessel, after stopping the flow of fluids. After being so treated, the well should be left closed in for a period of time sufficient to permit the reagent to drop to the bottom of the well.

For injection into the well annulus, the corrosion inhibitor is usually employed as a solution in a suitable solvent. The selection of solvent will depend much upon the exact reagent being used and its solubility characteristics.

For treating wells with packed-off tubing, the use of solid "sticks" or plugs of inhibitor is especially convenient. These may be prepared by blending the inhibitor with a mineral wax, asphalt or resin in a proportion sufficient to give a moderately hard and high-melting solid which can be handled and fed into the well conveniently.

The protective action of the herein described reagents appears to be maintained for an appreciable time after treatment ceases, but eventually is lost unless another application is made.

For example, for the protection of gas wells and gas-condensate wells, the amount of corrosion inhibitor used might range between about one-half to 3 lbs. per million cubic feet of gas produced, depending upon the amounts and composition of corrosive agents in the gas and the amount of liquid hydrocarbon and water produced. However, in no case does the amount of inhibitor required appear to be stoichiometrically related to the amount of acids produced by a well, since protection is obtained with much less corrosion inhibitor than usually would be required for neutralization of the acids produced.

These compositions are particularly effective in the prevention of corrosion in systems containing a corrosive aqueous medium, and most particularly in systems containing brines.

These polymeric reagents can also be used in the prevention of corrosion in the secondary recovery of petroleum by water flooding and in the disposal of waste water and brine from oil and gas wells. Still more particularly, they can be used in a process of preventing corrosion in water flooding and in the disposal of waste water and brine from oil and gas wells which is characterized by injecting into an underground formation an aqueous solution containing minor amounts of the compositions of this invention, in sufficient amounts to prevent the corrosion of metals employed in such operation.

When an oil well ceases to flow by the natural pressure in the formation and/or substantial quantities of oil can no longer be obtained by the usual pumping methods, various processes are sometimes used for the treatment of the oil-bearing formation in order to increase the flow of oil. These processes are usually described as secondary recovery processes. One such process which is used quite frequently is the water flooding process wherein water is pumped under pressure into what is called an "injection well" and oil, along with quantities of water, that have been displaced from the formation, are pumped out of an adjacent well usually referred to as a "producing well." The oil which is pumped from the producing well is then separated from the water that has been pumped from the producing well and the water is pumped to a storage reservoir from which it can again be pumped into the injection well. Supplementary water from other sources may also be used in conjunction with the produced water. When the storage reservoir is open to the atmosphere and the oil is subject to aeration this type of water flooding system is referred to herein as an "open water flooding system." If the water is recirculated in a closed system without substantial aeration, the secondary recovery method is referred to herein as a "closed water flooding system."

Because of the corrosive nature of oil field brines, to economically produce oil by water flooding, it is necessary to prevent or reduce corrosion since corrosion increases the cost thereof by making it necessary to repair and replace such equipment at frequent intervals.

We have discovered a method of preventing corrosion in systems containing a corrosive aqueous media, and most particularly in systems containing brines, which is characterized by employing the polymers described herein. For example, we have discovered an improved process of protecting from corrosion metallic equipment employed in secondary oil recovery by water flooding such as injection wells, transmission lines, filters, meters, storage tanks, and other metallic implements employed therein and particularly those containing iron, steel, and ferrous alloys, such process being characterized by employing in water flood operation an aqueous solution of the compositions of this invention.

The invention, then, is particularly concerned with preventing corrosion in a water flooding process characterized by the flooding medium, containing an aqueous or an oil field brine solution of these polymers.

In many oil fields large volumes of water are produced and must be disposed of where water flooding operations are not in use or where water flooding operations cannot handle the amount of produced water. Most States have laws restricting pollution of streams and land with produced waters, and oil producers must then find some method of disposing of the waste produced salt water. In many instances therefore, the salt water is disposed of by injecting the water into permeable low pressure strata below the fresh water level. The formation into which the water is injected is not the oil producing formation and this type of disposal is defined as salt water disposal or waste water disposal. The problems of corrosion of equipment are analogous to those encountered in the secondary recovery operation by water flooding.

The polymers of this invention can also be used in such water disposal wells thus providing a simple and economical method of solving the corrosion problems encountered in disposing of unwanted water.

Water flood and waste disposal operations are too well known to require further elaboration. In essence, the flooding operation is effected in the conventional manner except that the flooding medium contains a minor amount of these polymers, sufficient to prevent corrosion.

While the flooding medium employed in accordance with the present invention contains water or oil field brine and the polymers of this invention, the medium may also contain other materials. For example, the flooding medium may also contain other agents such as surface active agents or detergents which aid in wetting throughout the system and also promote the desorption of residual oil from the formation, sequestering agents which prevent the deposition of calcium and/or magnesium compounds in the interstices of the formation, bactericides which prevent the formation from becoming plugged through bacterial growth, tracers, etc. Similarly, they may be employed in conjunction with any of the operating techniques commonly employed in water flooding and water disposal processes, for example five spot flooding, peripheral flooding, etc. and in conjunction with other secondary recovery methods.

The concentration of the corrosion inhibitors of this invention will vary widely depending on the particular polymer, the particular system, etc. Concentrations of at least about ¼ p.p.m., such as about ¾ to 7,500 p.p.m. for example about 1 to 5,000 p.p.m., advantageously about 10 to 1,000 p.p.m., but preferably about 15–250 p.p.m. may be employed. Larger amounts can also be employed such as 1.5–5.0% although there is generally no commercial advantage in so doing.

For example, since the success of a water flooding operation manifestly depends upon its total cost being less than the value of the additional oil recovered from the oil reservoir, it is quite important to use as little as possible of these compounds consistent with optimum corrosion inhibition. Since these compounds are themselves inexpensive and are used in low concentrations, they enhance the success of a flood operation by lowering the cost thereof.

By varying the constituents of the composition, the compounds of this invention can be made more oil or more water soluble, depending on whether the composition is to be employed in oil or water systems.

Although the manner of practicing the present invention is clear from the foregoing description, the following non-limiting specific examples are included for purposes of illustration.

EXAMPLES

These tests were run under conditions so set up as to simulate those found in an actual producing well. The test procedure involved the measurement of the corrosive action of fluids inhibited by the compositions herein described upon sandblasted SAE 1020 steel coupons measuring ¼ inch in diameter and being 4 inches long when compared to test coupons containing no inhibitor and commercial inhibitors.

Clean pint bottles were half-filled (almost 200 ml.) with sea-water (i.e., tap water containing 3% by weight of the salts, magnesium chloride, calcium chloride, sodium sulfate and sodium chloride) which had been saturated with hydrogen sulfide. Those requiring inhibitor were charged with the same by pipetting calculated amounts contained in suitable solvents (water, isopropyl alcohol, mineral spirits) to give the required parts per million of inhibitor. Uninhibited blanks were run in conjunction with inhibited solutions. The bottles were now filled (total volume now about 400 ml.) leaving a small air space to allow for expansion. The weighed coupons attached to sealing caps were screwed onto the bottles and they were placed on a rotating wheel for seven days at 115° F. The coupons were then removed, cleaned electrolytically in 5% sulfuric acid (using the coupons as a cathode) and washed successively with dilute sodium hydroxide, twice with water, once with acetone and finally dried.

When the inhibitor was oil-soluble as contrasted to water-soluble, a two-phase system was used instead of the "all-brine system" and this simply consisted of using hydrogen sulfide saturated mineral spirits to replace 25% by volume of the brine.

The changes in the weights of the coupons during the corrosion test were taken as a measurement of the effectiveness of the inhibitor compositions. Protective percentage was calculated for each test coupon taken from the inhibited fluids in accordance with the following formula:

$$\frac{W_1 - W_2}{W_1} \times 100 = \text{percent protection}$$

in which $W_1$ is the loss in weight of the coupon taken from uninhibited fluids and $W_2$ is the loss in weight of coupons which were subjected to inhibited fluids.

The results obtained are presented in the following Table II.

All of the compositions prepared in Examples 1–27 are excellent corrosion inhibitors when tested and compared with the commercial corrosion inhibitors previously selected as the best commercial inhibitors for the corrosion system. The following examples are presented as exemplary.

TABLE II
[Percent protection at various p.p.m.]

| Inhibitor | 3 p.p.m. | 4 p.p.m. | 8 p.p.m. | 16 p.p.m. | 32 p.p.m. |
|---|---|---|---|---|---|
| Commercial Inhibitor | 41 | 60 | 62 | 73 | 80 |
| Polymer Example 1 | 94 | 79 | 88 | 88 | 91 |
| Polymer Example 2 | 80 | 75 | 86 | 86 | 85 |
| Polymer Example 3 | 79 | 88 | 92 | 88 | 89 |
| Polymer Example 4 | 80 | 84 | 90 | 90 | 91 |
| Polymer Example 5 | 81 | 85 | 90 | 91 | 91 |

These polymers can also be employed in conjunction with other corrosion inhibitors, for example of the film-forming type. Non-limiting examples include the acylated polyamines such as described in U.S. Patents Re. 23,227, 2,466,517, 2,468,163, 2,598,213 and 2,640,029. These acylated polyamines may be described as amides, imidazolines, tetrahydropyrimidines, etc.

Breaking oil-in-water emulsions

The polymers of this invention can also be used in a process for resolving or separating emulsions of the oil-in-water class, by subjecting the emulsion to these polymers.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-field emulsions containing small proportions of crude petroleum oil relatively stably dispersed in water or brine are representative oil-in-water emulsions. Other oil-in-water emulsions include: steam cylinder emulsions, in which traces of lubricating oil are found dispersed in condensed steam from steam engines and steam pumps, wax-hexane-water emulsions, encountered in de-waxing operations in oil refining; butadiene tar-in-water emulsions, in the manufacture of butadiene from heavy naphtha by cracking in gas generators, and occurring particularly in the wash box waters of such systems; emulsions of "flux oil" in steam condensate produced in the catalytic dehydrogenation of butylene to produce butadiene; styrene-in-water emulsions, in synthetic, rubber plants, synthetic latex-in-water emulsions, in plants producing copolymer butadiene-styrene or GRS synthetic rubber; oil-in-water emulsions occurring in the cooling water systems of gasoline absorption plants; pipe press emulsions from steam-actuated presses in clay pipe manufacture; emulsions of petroleum residues-in-diethylene glycol, in the dehydration of natural gas.

In other industries and arts, emulsions of oily materials in water or other non-oily media are encountered, for example, in sewage disposal operations, synthetic resin emulsions paint formulation, milk and mayonnaise processing, marine ballast water disposal, and furniture polish formulation. In cleaning the equipment used in processing such products, diluted oil-in-water emulsions are inadvertently, incidentally, or accidentally produced. The disposal of aqueous wastes is, in general, hampered by the presence of oil-in-water emulsions.

Essential oils comprise non-saponifiable materials like terpenes, lactones, and alcohols. They also contain saponifiable esters or mixtures of saponifiable and non-saponifiable materials. Steam distillation and other production procedures sometimes cause oil-in-water emulsions to be produced, from which the valuable essential oils are difficult to recover.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media in addition to water itself.

The foregoing examples illustrate the fact that, within the broad genus of oil-in-water emulsions, there are at least three important sub-genera. In these, the dispersed oily material is respectively non-saponifiable, saponifiable, and a mixture of non-saponifiable and saponifiable materials. Among the most important emulsions of non-saponifiable material in water are petroleum oil-in-water emulsions. Saponifiable oil-in-water emulsions have dispersed phases comprising, for example, saponifiable oils and fats and fatty acids, and other saponifiable oily or fatty esters and the organic components of such esters to the extent such components are immiscible with aqueous media. Emulsions produced from certain blended lubricating compositions containing both mineral and fatty oil ingredients are examples of the third sub-genus.

Oil-in-water emulsions widely different proportions of dispersed phase. Where the emulsion is a waste product resulting from the flushing with water of manufacturing areas or equipment, the oil content may be only a few parts per million. Resin emulsion paints, as produced, contain a major portion of dispersed phase. Naturally-occurring oil-field emulsions of the oil-in-water class carry crude oil in proportions varying from a few parts per million to about 20%, or even higher in rare cases.

The present invention is concerned with the resolution of those emulsions of the oil-in-water class which contain a minor proportion of dispersed phase, ranging from 20% down to a few parts per million. Emulsions containing more than about 20% of dispersed phase are commonly of such stability as to be less responsive to the present polymers, possibly because of the appreciable content of emulsifying agent present in such systems, whether intentionally incorporated for the purpose of stabilizing them, or not.

Although the present invention relates to emulsions containing as much as 20% dispersed oily material, many if not most of them contain appreciably less than this proportion of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed. This does not mean that any sharp line of demarcation exists and that, for example, an emulsion containing 1.0% of dispersed phase will respond to the process, whereas one containing 1.1% of the same dispersed phase will remain unaffected; but that, in general, dispersed phase proportions of the order of 1% or less appear most favorable for application of the present process.

In emulsions having high proportions of dispersed phase, appreciable amount of some emulsifying agent are probably present, to account for their stability. In the case of more dilute emulsions, containing 1% or less of dispersed phase, there may be difficulty in accounting for their stability on the basis of the presence of an emulsifying agent in the conventional sense. For example, steam condensate frequently contains very small proportions of refined petroleum lubricating oil in extremely stable dispersion; yet neither the steam condensate nor the refined hydrocarbon oil would appear to contain anything suitable to stabilize the emulsion. In such cases, emulsion stability must probably be predicated on some basis other than the presence of an emulsifying agent.

The present process, as stated above, appears to be effective in resolving emulsions containing up to about 20% of dispersed phase. It is particularly effective on emulsions containing not more than 1% of dispersed phase, which emulsions are the most important, in view of their common occurrence.

The present process is not believed to depend for its effectiveness on the application of any simple laws, because it has a high level of effectiveness when used to resolve emulsions of widely different composition, e.g., crude or refined petroleum in water or diethylene glycol, as well as emulsions of oily materials like animal or vegetable oils or synthetic oily materials in water.

Some emulsions are by-products of manufacturing procedures in which the composition of the emulsion and its ingredients is known. In many instances, however, the emulsions to be resolved are either naturally-occurring or are accidentally or unintentionally produced; or in any event they do not result from a deliberate or premediated emulsification procedure. In numerous instances, the emulsifying agent is unknown and as a matter of fact an emulsifying agent, in the conventional sense, may be felt to be absent. It is obviously very difficult or even impossible to recommend a resolution procedure for the treatment of such latter emulsions on the basis of theoretical knowledge. Many of the most important applications of the present process are concerned with the resolution of emulsions which are either naturally-occurring or are accidentally, unintentionally, or unavoidably produced. Such emulsions are commonly of the most dilute type, containing about 1% or less of dispersed phase, although concentrations up to 20% are herein included, as stated above.

The process which constitutes the present invention consists in subjecting an emulsion of the oil-in-water class to the action of the polymer of the kind described, thereby causing the oil particles in the emulsion to coalesce sufficiently to rise to the surface of the non-oily layer (or settle to the bottom, if the oil density is greater), when the mixture is allow to stand in the quiescent state after treatment with the polymer reagent or demulsifier.

Applicability of the present process can be readily determined by direct trial on any emulsion, without reference to theoretical considerations. This fact facilitates its application to naturally-occurring emulsions, and to emulsions accidentally, unintentionally, or unavoidably produced; since no laboratory experimentation, to discover the nature of the emulsion components or of the emulsifying agent, is required.

The present reagents are useful because they are able to recover the oil from oil-in-water class emulsions advantageously and at low cost. In some instances, they have been found to resolve emulsions which were not economically or effectively resolvable by any other known means.

These polymeric reagents are useful in undiluted form or diluted with any suitable solvent. Water is commonly found to be a highly satisfactory solvent, because of its ready availability and negligible cost; but in some cases, non-aqueous solvents such as aromatic petroleum solvent may be found preferable. The products themselves may exhibit solubilities ranging from rather modest water-dispersibility to full and complete dispersibility in that solvent. Because of the small proportions in which our reagents are customarily employed in practicing our process, apparent solubility in bulk has little significance. In the extremely low concentrations of use they undoubtedly exhibit appreciable water-solubility of water-dispersibility as well as oil-solubility or oil-dispersibility.

These polymeric reagents may be employed alone, or they may in some instances be employed to advantage admixed with other and compatible oil-in-water demulsifiers.

This process is commonly practiced simply by introducing sufficient but minor proportions of the polymer into an oil-in-water class emulsion, agitating to secure distribution of the reagent and incipient coalescence, and letting stand until the oil phase separates. The proportion of polymer required will vary with the character of the emulsion to be resolved. Ordinarily, proportions of reagent required are from about .005 p.p.m.–10,000 p.p.m. such as 1–1,000 p.p.m., for example about 3–300 p.p.m., but preferably 5–50 p.p.m., based on the volume of emulsions treated, but more is sometimes required. Since the economics of the process are important, no more is employed than is required for effective separation. We have found that such factors as the nature of the particular polymer, feed rate, agitation and settling time are somewhat inter-related. For example, we have found that if sufficient agitation of proper character is employed, the settling time is shortened materially. On the other hand, if satisfactory agitation is not available, but extended settling time is, the process is equally productive of satisfactory results.

Agitation may be achieved by any available means. In many cases, it is sufficient to introduce the polymeric reagent into the emulsion and use the agitation produced as the latter flows through a conduit or pipe. In some cases, agitation and mixing are achieved by stirring together or shaking together the emulsion and polymer. In some instances, distinctly improved results are obtained by the use of air or other gaseous medium. Where the volume of gas employed is relatively small and the conditions of its introduction relatively mild, it behaves as a means of securing ordinary agitation. Where aeration is effected by introducing a gas directly under pressure or from porous plates or by means of aeration cells, the effect is often importantly improved, until it constitutes a difference in kind rather than degree. A sub-aeration type flotation cell, of the kind commonly employed in ore beneficiation operations, is an extremely useful adjunct in the application of our polymer reagents to many emulsions. It frequently accelerates the separation of the emulsion, reduces reagent requirements, or produces an improved effluent. Sometimes all three improvements are observable.

Heat is ordinarily of little importance in resolving oil-in-water class emulsions with our reagents. Still there are some instances where heat is a useful adjunct. This is especially true where the viscosity of the continuous phase of the emulsion is appreciably higher than that of water.

In some instances, importantly improved results are obtained by adjusting the pH of the emulsion to be treated, to an experimentally determined optimum value.

The polymeric reagent feed rate also has an optimum range, which is sufficiently wide, however, to meet the tolerances required for the variances encountered daily in commercial operations. A large excess of reagent can produce distinctly unfavorable results.

The manner of practicing the present invention is clear from the foregoing description. However, for completeness the following non-limiting specific examples are included for purposes of illustration.

An oil-in-water petroleum emulsion was treated as follows:

A series of four bottles of the emulsion were treated with the polymeric reagents in the following concentrations 30, 15, 7.5 and 3.75 p.p.m., based on the emulsion. A commercial oil-in-water demulsifier was run as a control and at the same concentrations as the polymeric reagent after sufficient agitation, in the form of 130 shakes per minute for 5 minutes. The bottles were observed and comparisons drawn between the effect of the polymeric reagent and the commercial demulsifier as to which gave the clear water layer.

In all cases employing the polymeric reagents of Table I, Examples 1–27, it was found that the polymeric reagents of this invention were superior to the commercial demulsifier. After selecting the demulsifier by the above procedure, the demulsifier is employed in a commercial application. The following illustrates commercial applications of this invention.

Commercial Example A

Our process is practiced on location by flowing the well fluids, consisting of free crude oil, oil-in-water emulsion, and natural gas, through a gas separator, then to a steel tank of 5,000-barrel capacity. In this tank, the oilin-water emulsion falls to the bottom and is so separated from the free oil. The oil-in-water emulsion is withdrawn from the bottom of this tank, and the demulsifier selected is introduced into the stream at this point. Depending on the emulsion, the proper proportion of demulsifier is employed.

The chemicalized emulsion flows to a second tank, mixing being achieved in the pipe. In the second tank it is allowed to stand quiescent. Clear water is withdrawn from the bottom of this tank, separated oil from the top.

Commercial Example B

This is an example of the application of the aeration step in our process. The emulsion is a naturally-occurring petroleum oil-in-water emulsion. It is placed in a sub-aeration flotation cell of the type commonly employed in the ore beneficiation industry. The stirring mechanism is started to begin introduction of the air, and at the same time the mixture of the selected demulsifier is added in the proper proportions of demulsifier to emulsion. Clear examples are taken from the bottom of the machine.

This example illustrates the beneficial influence of the aeration technique. In most cases, it accelerates separation. In some, it permits use of smaller proportions of reagent; but in some cases, it achieves resolution, whereas, in absence of its use, satisfactory separation may not be achieved in reasonable time with reasonable reagent consumption.

Our reagents have likewise been successfully applied to other oil-in-water class emulsions, of which representative examples have been referred to above. Their use is, therefore, not limited to crude petroleum-in-water emulsions.

Water clarification

The present invention also relates to a method for the clarification of water containing suspended matter.

Accordingly clarification of water containing suspended particles of matter is effected by adding to such water polymers of this invention.

Water containing suspended particles which may be treated by the present invention may have its origin either in natural or artificial sources, including industrial and sanitary sources. Waters containing suspended particles of natural origin are usually surface waters, wherein the particles are suspended soil particles (silt), although subsurface waters may also be treated according to the present invention. Water having its origin in industrial process (including sanitary water) operations may contain many different varieties of suspended particles. These particles are generally the result of the particular industrial or sanitary operation concerned. Prior to discharging such industrial waste waters into natural water courses it generally is desired that the suspended matter be removed.

The present process may likewise be applied to water contained in stock or fish ponds, lakes or other natural or artificial bodies of water containing suspended solids. It may be applied to industrial water supplied either in preparation therefor, during or after use and prior to disposal. It may be applied to sanitary water supplies either for the elimination of suspended solids prior to use for such purposes, or it may be applied to such waters which have become contaminated with impurities from any source.

Most naturally occurring waters contain an amount of simple electrolytes (sodium, potassium, ammonium, calcium, aluminum salts, etc.) in excess of that necessary for the initial aggregation of the ultimate silt particles. This is likewise true of particles of suspended material in industrial or sanitary waters. The ultimate particles of silt or other materials are therefore naturally somewhat aggregated by reason of the presence of such electrolytes. However, the forces binding such ultimate particles together are not great and moreover are not such as to generally effect either rapid settling rates of the flocculated material or strong enough to prevent deflocculation.

The polymers of this invention cause rapid flocculation and also reinforce the formed aggregates of particles causing a general tightening or bonding together of the initial particles and an increased rate of coagulation and settling, thus forming a less turbid supernatant liquid.

The addition of the polymers of this invention to the water suspension should be made in such a fashion that the resulting flocculation and aggregation of the particles takes place uniformly throughout the body of water. In order to obtain a uniform addition of the compositions of the invention to the waterborne suspension it is generally desirable to prepare a relatively dilute stock solution of the polymer compositions and then to add such solution to the body of water in the proportions indicated above. Clarification may take place either in the natural body of water or it may be caused to take place in hydraulic thickeners of known design.

The amount of polymeric compositions to be employed will vary depending upon the amount and the degree of subdivision of the solids to be agglomerated or flocculated, the chemical nature of such solid and the particular inventive compositions employed. In general, we employ at least a sufficient amount of the polymeric compositions to promote flocculation. In general, we employ 0.005–10,000 p.p.m. or more such as about 0.5–1,000 p.p.m., for example about 1–500 p.p.m., but preferably about 2–5 p.p.m. Since the economics of these processes are important, no more than the minimum amount required for efficient removal is generally employed. It is desired, of course, to employ sufficient polymeric compositions so flocculation will take place without causing the formation of stable dispersions.

The precipitating action of the polymeric compositions can be employed in the application of loading or filling materials to textiles or paper.

In the processing of fine mineral particles in aqueous suspension the polymeric composition flocculating agents will be especially useful. In the processing of ores to separate valuable mineral constituents from undesirable matrix constituents, it is frequent practice to grind the ore into a finely-divided state to facilitate separation steps such as selective flotation and the like. In many ore dressing procedures, the finely-divided ore is suspended in water to form a pulp or slime. After processing, it is usually desirable to dewater the pulps or slimes ether by sedimentation or filtering. In such operations, certain ores are particularly troublesome in that the finely-divided ore, when suspended in water, forms a stable slime which settles very slowly, if at all. Such slimes are unsuitable for concentration or dewatering by sedimentation and are difficult to dewater by filtration because of the tendency to clog the pores of the filter, thus leading to excessively time-consuming and inefficient operation of the filters. In some case, for example, in certain phosphate mining operations, the formation of very stable suspensions of finely-divided mineral results not only in the loss of considerable valuable mineral as waste but also requires large expenditures for the maintenance of holding ponds for the waste. Similar problems are involved in processing gold, copper, nickel, lead, zinc, iron, such as taconite ores, uranium and other ores, and the inventive flocculating agents will be useful in these operations.

Some specific additional applications for the polymeric composition of this invention, not intended to be limiting but merely llustrative are listed below. The polymeric composition can be used for the clarification of beers or wines during manufacture. Another use is in processing effluents in pharmaceutical operations for the recovery of valuable products or removal of undesirable by-products. A particularly important use for these polymeric flocculating agents is in the clarification of both beet sugar and cane sugar juices in their processing. Still another use is for flocculation and recovery of pigments from aqueous suspensions thereof. The polymeric composition will be particularly useful in sewage treatment operations as a flocculating agent. A further use is to promote by flocculation the removal of coal from aqueous suspension thereof. In other words, the polymeric flocculating agents of the invention are generally useful for processing aqueous effluents of all types to facilitate the removal of suspended solids.

A water soluble or water dispersible polymer, to the extent of effective concentration, is employed.

These compositions can also be employed in the process of flocculating white water and/or recycling of the precipitate solids in the paper making process described in U.S. application Ser. No. 347,023, filed Feb. 24, 1964, now U.S. Patent No. 3,276,952, and other processes described therein.

Although the manner of practicing the present invention is clear from the foregoing description, the following non-limiting specific examples are included for purposes of illustration.

Naturally occurring water from many sources, and in some instances, brine and brackish waters are used in the recovery of petroleum by secondary water-flooding operations. Clarification of the water is necessary in many instances prior to water flooding because the suspended impurities tend to plug the underground formations into which waters are pumped.

EXAMPLES

A suspension of FeS in brine was subjected to the action of the water-soluble polymers prepared herein.

In these tests, the FeS concentration is 25 parts per million and 1% and 5% brine solution were used. Metered quantities (500 ml.) of the homogeneous suspension were placed into 1,000 ml. beakers and stirred at 100 r.p.m. The polymer to be tested was injected into the suspension to give final active concentrations varying between 2 through 4 parts per million. A commercial flocculant was run simultaneously at equivalent concentrations for comparison and the stirring was achieved by use of a Phipp and Bird "floc" multi-stirrer. After one minute the stirring rate was reduced to 20 to 30 r.p.m. and maintained thus for ten minutes. At this time the stirring was stopped. The evaluation of the polymer started at the moment of flocculation and continued with respect to the "floc" size and rate of precipitation. The final evaluation was achieved by visual examination of the color of the resultant aqueous phase.

The results obtained by employing the polymers of Table I, Examples 1–27 are found to be superior to the commercial flocculating agent usually employed.

These polymers are also effective in flocculating the other systems described herein.

The following is a partial list of industrial systems in which the polymers of the present invention can be employed as flocculating agents.

(1) Petroleum industry
(2) Food industry such as in the diary industry, the canning, freezing and dehydration industries
(3) Metal plating industry
(4) Chemical and pharmaceutical industries
(5) Mining industry, for example, in the phosphate mining industry such as in phosphate slimes
(6) Fermentation industries, such as in alcohol, beer, yeast, antibiotics, etc. production
(7) Tanning industry
(8) Meat packing and slaughter house industry
(9) Textile industry
(10) Sugar refining industry
(11) Coal industry
(12) Soap industry
(13) Sewage purification
(14) Corn starch industry
(15) Fat processing and soap industry
(16) Paper industry
(17) Hydroelectric plants, atomic energy operations, boiler plants, etc.

Other derivatives

These products may be further reacted to form derivatives thereof, for example, they may be oxyalkylated with alkylene oxides such as ethylene oxide, propylene oxide, butylene oxide, octylene oxide, alone or in combination; with styrene oxide, glycide, methyl glycide, allyl glycidyl ether, glycidyl isopropyl ether, glycidyl phenylether, diepoxides, polyepoxides, etc.

They may be reacted with alkylene imines such as ethyleneimine, propylene imine, etc., dialkylaminoepoxypropane of the structure

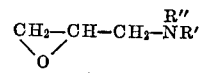

where the R's are alkyl, etc.

They may be acylated with monocarboxylic acids, such as aromatic acids, fatty acids, aliphatic acids, etc. and polycarboxylic acids, aliphatic dicarboxylic acids, aromatic dicarboxylic acids for example diglycoilic, phthalic, succinic, etc., acids.

These compounds may also be treated with more than one agent, for example, they may be partially acylated, then oxyalkylated, partially oxyalkylated then acylated, etc.

Salts may be formed of these polymers as derivatives for example salts of either organic or inorganic acids such as acetic acid, glycollic acid, fatty acids, benzoic acid, etc. HCl, sulfuric acids, etc.

Other uses

In addition to the uses described above, these compositions and/or derivatives thereof, can be used as follows:

(1) As demulsifiers for oil-in-water emulsions.
(2) As biocides i.e. bacteriocides, algicides, etc.
(3) As additives to various petroleum fuels including gasoline, diesel fuel, jet fuels, etc.
(4) As gasoline anti-icers and anti-stallers.
(5) As flotation agents, such as flotation collection agents
(6) As asphalt emulsifiers and anti-stripping agents for asphalt-mineral aggregate compositions.
(7) As emulsifiers, for example, in metal cleaners, auto polishes, wax emulsions, etc.
(8) As additives for sludging oil and cutting oils.
(9) As fuel "dehazing" agents.
(10) As agents for preparing emulsions for the "hydrofrac" process of enhancing oil recovery.
(11) As agents to prepare polymer emulsions.
(12) As agents of solvents to inhibit paraffin deposition.
(13) As agents for the textile industry such as mercerizing assistants, wetting agents, rewetting agents, penetrating agents, dispersing agents, softening agents, dyeing assistants, etc.
(14) As anti-static agents for textiles, plastics, etc.
(15) As agents in leather processing.
(16) As lube oil additives.
(17) As emulsifiers for insecticidal and agricultural compositions.
(18) As additives for rubber latices, for example, to prevent acid coagulation.
(19) As additives in the production of latex foam rubber, for example, as gel sensitizers and processing aids in the manufacture of foam rubber.
(20) As additives for pigment dispersion in various applications such as paints, plastic, rubber, etc.
(21) As additives for primer paints to help insure adhesion to metallic surfaces.
(22) As additives useful as a freeze-thaw stabilizer for latex-base paints.
(23) As agents for the pulp and paper industry, such as sizing aids, etc.
(24) As general metal deactivators.

Having thus described our invention what we claim as new and desire to obtain by Letters Patent is:

1. A polymer having the formula

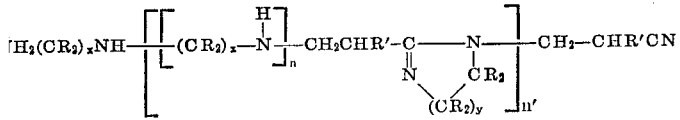

where R is a radical selected from the group consisting of hydrogen, methyl and ethyl, R' is a radical selected from the group consisting of hydrogen, methyl and ethyl, $n$ is an integer of 0–9, $n'$ is an integer of 2–100, $x$ is an integer of 2 and 3, and $y$ is an integer of 1 and 2.

2. The polymer of claim 1 wherein R is hydrogen and R' is hydrogen.

3. The polymer of claim 2 wherein $x$ is 2, $y$ is 1, $n$ is 0 and the molecular weight is between 800–900.

References Cited

UNITED STATES PATENTS

| | | | |
|---|---|---|---|
| 2,374,354 | 4/1945 | Kaplan | 260—2 |
| 3,166,521 | 1/1965 | Howard | 260—2 |
| 3,174,947 | 3/1965 | Marvel et al. | 260—2 |
| 3,210,371 | 10/1965 | Sawa et al. | 260—88.7 |
| 3,218,270 | 11/1965 | Delman et al. | 260—2 |

FOREIGN PATENTS

| | | |
|---|---|---|
| 865,686 | 4/1961 | Great Britain. |
| 739,037 | 9/1943 | Germany. |

SAMUEL H. BLECH, *Primary Examiner.*

U.S. Cl. X.R.

210—54; 252—8.55, 326, 344, 390; 260—29.7, 78.4, 256.4, 309.6, 465.5, 830, 999